US010111067B2

(12) United States Patent
Bennett et al.

(10) Patent No.: US 10,111,067 B2
(45) Date of Patent: Oct. 23, 2018

(54) METHOD AND APPARATUS FOR COMMUNICATING SYSTEM INFORMATION AND RANDOM ACCESS IN A WIRELESS SYSTEM

(71) Applicant: Sierra Wireless, Inc., Richmond (CA)

(72) Inventors: Steven John Bennett, Coquitlam (CA); Gustav Gerald Vos, Surrey (CA)

(73) Assignee: SIERRA WIRELESS, INC. (CA)

( * ) Notice: Subject to any disclaimer, the term of this patent is extended or adjusted under 35 U.S.C. 154(b) by 0 days.

(21) Appl. No.: 15/092,845

(22) Filed: Apr. 7, 2016

(65) Prior Publication Data

US 2016/0302024 A1  Oct. 13, 2016

Related U.S. Application Data

(60) Provisional application No. 62/144,266, filed on Apr. 7, 2015.

(51) Int. Cl.
 *H04W 4/70* (2018.01)
 *H04W 48/12* (2009.01)
 *H04W 72/12* (2009.01)

(52) U.S. Cl.
 CPC ............ *H04W 4/70* (2018.02); *H04W 48/12* (2013.01); *H04W 72/12* (2013.01)

(58) Field of Classification Search
 CPC ...... H04W 48/02; H04W 4/005; H04W 72/12
 See application file for complete search history.

(56) References Cited

U.S. PATENT DOCUMENTS

2013/0272148 A1* 10/2013 Fong .................... H04W 28/02
                                                                370/252
2015/0373690 A1* 12/2015 Webb .................. H04W 72/042
                                                                370/330

FOREIGN PATENT DOCUMENTS

WO    WO2014114917 A1    7/2014
WO    WO2016161510 A1    10/2016

OTHER PUBLICATIONS

Huawei, H., et al., "Consideration on SIB transmissions for MTC UEs", R1-134052, 3GPP TSG RAN WG1 #74BIS, Oct. 7, 2013, pp. 1-3.

(Continued)

*Primary Examiner* — Lewis West
(74) *Attorney, Agent, or Firm* — Mendelsohn Dunleavy, P.C.

(57) ABSTRACT

A method and apparatus for communicating system information and random access in a wireless communication system in an LTE system is provided. In some embodiments, a system information block (SIB) is transmitted in a configuration that is receivable by a limited-capability UE. The SIB may indicate a schedule of additional SIBs transmitted in the same configuration. The schedule may also be transmitted in another manner which is beyond capabilities of the UE to receive but within capabilities of full-capability UEs. Legacy SIB data may be spread between multiple new SIBs in this configuration. The configuration may include a limited transport block size and use of a limited number of physical resource blocks. Also provided is a Master Information Block (MIB) which indicates an extended System Frame Number count. Also provided is a means for communicating operating requirements from a UE by varying the timing and frequency of random access calls.

22 Claims, 7 Drawing Sheets

(56) References Cited

OTHER PUBLICATIONS

International Search Report and Written Opinion; dated Jun. 20, 2016 for PCT Application No. PCT/CA2016/050397.

* cited by examiner

METHOD AND APPARATUS FOR COMMUNICATING SYSTEM INFORMATION AND RANDOM ACCESS IN A WIRELESS SYSTEM

CROSS-REFERENCE TO RELATED APPLICATIONS

This application claims the benefit and priority of U.S. Provisional Application 62/144,266 filed Apr. 7, 2015. The foregoing application is incorporated by reference herein in its entirety.

FIELD OF THE INVENTION

The present technology pertains in general to wireless communications and in particular to communication of certain broadcast system information and random access in accordance with wireless standards such as LTE.

BACKGROUND

The Long Term Evolution (LTE) wireless communication standard potentially offers a high-capacity, high-speed wireless interface for use by mobile phones, data terminals, machine-type-communication (MTC) or machine-to-machine (M2M) equipment, and the like. However, in some instances it may be desirable to sacrifice aspects of an LTE terminal's performance (such as its data capacity) in order to gain other benefits, such as a reduced complexity and/or cost. The $3^{rd}$ Generation Partnership Project™ has considered such possibilities, for example in connection with "low-cost" or "limited capability" User Equipment (UE).

For User Equipment (UE) mobile devices/wireless terminals operating in a wireless communication system such as a Long Term Evolution (LTE) system, the UE is required to have the most up to date versions of the Master Information Block (MIB) and System Information Blocks (SIBs) before the UE can transmit within the wireless system. For example, acquiring MIB and SIBs is typically done during initial power up of the UE, when changes in the cell being used for wireless communication occur, or when the MIB or SIB changes.

For a UE to access the evolved Node B (eNB), information from at least two different SIBs, namely SIB1 and SIB2, is typically required. SIB1 carries information relating to cell access related information, for example cell access related information, cell selection information and scheduling information. As is known, SIB1 uses a fixed schedule for transmission by the eNB with a periodicity of 80 ms and repetitions made within 80 ms.

Currently, there is a focus in the industry on providing improved power consumption for a UE, in particular for machine-to-machine (M2M) wireless devices, or Machine Type Communication (MTC) devices, which may have significantly different operating requirements from typical user devices. For example, M2M devices such as wireless monitors or meters may only transmit relatively small amounts of data, possibly infrequently and possibly with high tolerance to latency, system acquisition times or the like.

Low power, low cost UE devices that are also able to work in low signal levels requiring coverage extension are desired. However, constraining these devices to receive the currently existing information messages (MIB and SIBs) requires these types of UE devices to receive more information than they need. Accordingly, unnecessary power is potentially being used to receive and process these information messages that may not be necessary for their desired level of operation.

Therefore there is a need for a method and apparatus for improving power consumption of a UE that is not subject to one or more limitations in the prior art.

This background information is provided for the purpose of making known information believed by the applicant to be of possible relevance to the present technology. No admission is necessarily intended, nor should be construed, that any of the preceding information constitutes prior art against the present technology.

SUMMARY

An object of the present technology is to provide a method and apparatus for communicating system information and random access in a wireless communication system.

In accordance with embodiments of the present invention, there is provided a method for communicating system information from a base station to a user equipment (UE) in a wireless communication system, the method comprising: transmitting a system information block (SIB) in a configuration that is receivable by the UE, wherein the UE is a limited-capability UE which is capable of receiving wireless transmissions from the base station in a limited manner relative to another class of UE compatible with the wireless communication system. In some embodiments, the SIB includes information indicative of a schedule of one or more additional SIBs transmitted in the configuration which is receivable by the UE. In some embodiments, the base station further transmits said information indicative of the schedule of the one or more additional SIBs in another manner which is beyond capabilities of the UE to receive and within capabilities of said other class of UE to receive.

In accordance with embodiments of the present invention, there is provided a base station configured for communicating system information to a user equipment (UE) in a wireless communication system, the base station comprising: a system information block (SIB) module configured to generate a SIB in a configuration that is receivable by the UE, wherein the UE is a limited-capability UE which is capable of receiving wireless transmissions from the base station in a limited manner relative to another class of UE compatible with the wireless communication system; and a radio frequency transceiver configured to transmit the SIB in said configuration. In some embodiments, the SIB module is configured to include, in the SIB, information indicative of a schedule of one or more additional SIBs transmitted by the radio frequency transceiver in the configuration which is receivable by the UE. In some embodiments, the radio frequency transceiver is further configured to transmit said information indicative of the schedule of the one or more additional SIBs in another manner which is beyond capabilities of the UE to receive and within capabilities of said other class of UE to receive.

In accordance with embodiments of the present invention, there is provided a limited-capability UE which is configured to interoperate with a base station as described above. The UE may be configured to receive an SIB transmitted in a particular limited configuration. The UE may be configured to decode the SIB to obtain scheduling information, such as information indicative of a schedule of one or more additional SIBs, such as follow-on SIBs which contain additional information to be appended to the SIB.

In accordance with embodiments of the present invention, there is provided a UE for use with a wireless communication system, the UE comprising: a radio frequency transceiver which is capable of receiving wireless transmissions from the base station in a limited manner relative to another class of UE compatible with the wireless communication system; and a system information block (SIB) decoding module configured to receive a first SIB transmitted by the base station in a configuration which is receivable by the UE, and to decode the first SIB to determine information carried in the first SIB which is indicative of a schedule of one or more additional SIBs transmitted by the base station in the configuration which is receivable by the UE.

In accordance with embodiments of the present invention, there is provided a method for communicating system information from a base station to a user equipment (UE) in a Long Term Evolution (LTE) wireless communication system, the method comprising: transmitting a Master Information Block (MIB) from the base station, the MIB including one or more bits indicative of a current value of an extended System Frame Number (SFN) count, the extended SFN count incremented at a period which is longer than an increment period of a SFN counter tracked by the LTE wireless communication system.

In accordance with embodiments of the present invention, there is provided a base station configured for communicating system information to a user equipment (UE) in a Long Term Evolution (LTE) wireless communication system, the base station comprising: a Master Information Block (MIB) generation module configured to generate a MIB including one or more bits indicative of a current value of an extended System Frame Number (SFN) count, the extended SFN count incremented at a period which is longer than an increment period of a SFN counter tracked by the LTE wireless communication system; and a radio frequency transceiver configured to transmit the MIB Master Information Block (MIB) for reception by the UE.

In accordance with embodiments of the present invention, there is provided a method for communicating operating information from a user equipment (UE) to a base station in a Long Term Evolution (LTE) wireless communication system, the method comprising: transmitting, from the UE, a random access call, wherein one or both of: a timing of the random access call; and a radio frequency of the random access call are configured to fall within a range which corresponds to an operating requirement of the UE.

In accordance with embodiments of the present invention, there is provided a method for communicating operating information from a user equipment (UE) to a base station in a Long Term Evolution (LTE) wireless communication system, the method comprising: wirelessly receiving a random access call from the UE; and determining an operating requirement of the UE based on one or both of: a timing of the random access call; and a radio frequency of the random access call, based on a predetermined correspondence between a plurality of UE operating requirements and a respective plurality of random access call timings, radio frequencies, or both, indicative of each one of the plurality of UE operating requirements.

In accordance with embodiments of the present invention, there is provided a user equipment (UE) for use with a Long Term Evolution (LTE) wireless communication system, the UE comprising: a random access call module configured to define one or both of: a timing of a random access call to be transmitted by the UE; and a radio frequency of the random access call, the timing, the radio frequency, or both, configured to fall within a range which corresponds to an operating requirement of the UE; and a radio frequency transceiver configured to transmit the random access call using the timing, the radio frequency, or both.

In accordance with embodiments of the present invention, there is provided a base station for a Long Term Evolution (LTE) wireless communication system, the base station comprising: a radio frequency transceiver configured to wirelessly receive a random access call from the UE; and a random access call interpretation module configured to determine an operating requirement of the UE based on one or both of: a timing of the random access call; and a radio frequency of the random access call.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this technology belongs.

Various technical terms specified herein may be understood with reference to standards documents pertaining to the Long Term Evolution (LTE) wireless communication, or similar wireless communication standards such as UMTS. While these terms should be read in a manner that is consistent with at least the LTE standard, it is understood that the technology as described herein may be adapted for use with certain other existing or future wireless communication standards or protocols. Relevant standards documents are available through http://www.3gpp.org.

A 3GPP work item for a new category (Category M) of User Equipment (UE) includes objectives for lower cost, lower power consumption and for coverage enhancement (CE). This category is sometimes referred to as LTE-M or LTE-M2M. In order to meet these objectives, some performance limitations on data transfer quantity and bandwidth can be required. Potential consequences of this can be that some legacy signalling information may no longer be receivable by the Category M UEs and thus may need to be duplicated in a format receivable by these UEs. It is desired to specify new signalling concepts that are sufficiently compact to fit within imposed constraints, and are also capable of being received by the Category M UEs in coverage enhancement scenarios. Coverage enhancement is set forth in the LTE standard.

In some embodiments, there is provided a method and apparatus for enabling idle mode mobility to be supported for a Category M UE without incurring significant system signalling overhead.

In some embodiments, there is provided a method and apparatus to indicate support capabilities from the evolved Node B (eNB) to the UE, or to indicate UE capabilities to the eNB, or both.

Signalling of Mobility Support System Information

Some embodiments of the present invention provide for a Category M UE which is configured to read required system information in order for it to have idle mode mobility capabilities. As will be readily understood by a worker skilled in the art, idle mode mobility capabilities in LTE typically relies on UE measurements and decisions regarding whether or not to perform cell reselection. The required system information is typically contained in legacy LTE System Information Blocks (SIBs), particularly SIB3, SIB4 and SIB5. As such, a Category M UE may have difficulty reading this information due to the legacy scheduling being in SIB2 that Category M UEs may not be capable of reading directly unless they are specially adapted to do so. This inability is due to bandwidth allocations that may not be within the 6 Physical Resource Block (PRB) capability limit and a potential size of SIBs exceeding the 1000-bit Transport Block Size (TBS) capability limit of such UEs. The information in these legacy LTE SIBs includes parameters for selecting alternative cells, both intra-frequency and inter-frequency within the same LTE system. Without this information a UE that moves out of coverage in a cell typically must re-discover and re-connect to another LTE cell or network whenever this move occurs, or when it is required to originate a call. This requirement can result in significant delay in completing a call that may be unacceptable in some use cases.

Some embodiments of the present invention provide a method and apparatus for enabling the reception of the information in SIB3, SIB4 and SIB5, and hence facilitating a UE's ability to change quickly from cell to cell as it moves. This may put the UE in a condition ready to transmit and receive when needed in a more timely manner.

In some embodiments, for example at a Mobile Network Operator's (MNO) option, the existing SIB3, SIB4 and SIB5 may be used by the Category M UEs, subject to these SIBs containing less than 1000 bits each. In some embodiments, these SIBs are scheduled in 6 contiguous PRBs in order to make them receivable by Category M UEs. Signalling of the location of the SIBs is simultaneously indicated by legacy LTE methods in the physical downlink control channel (PDCCH) and also in a mechanism receivable by the Category M UEs. In various embodiments, as described in more detail below, the time-frequency location of transmission of a SIB within the LTE communication channels may be included in another SIB which is receivable by the Category M UEs, for example a Category M SIB or in some cases a Category M SIBnbis.

Figure 1:
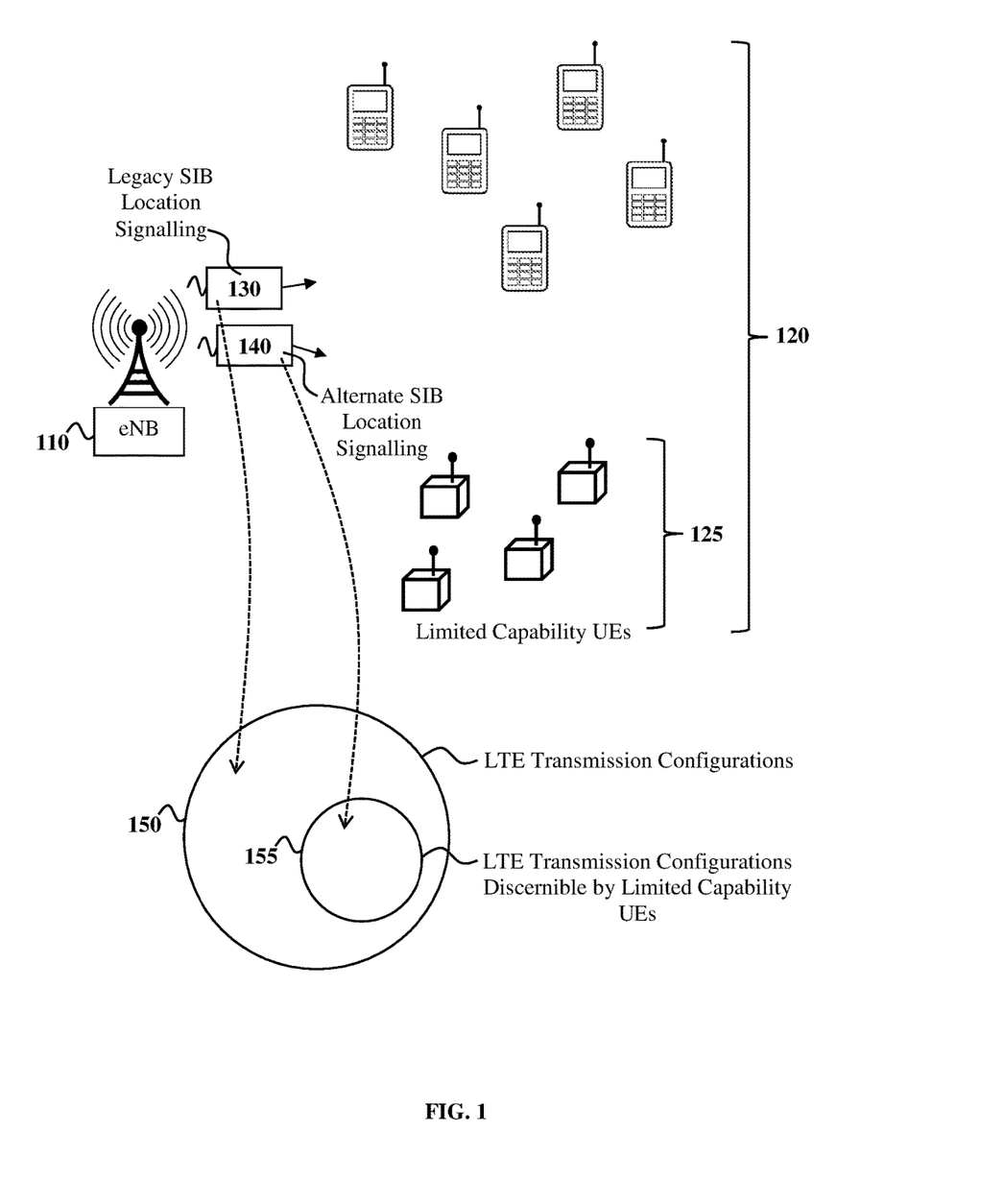
FIG. 1 illustrates an eNB serving a population of UEs including limited-capability UEs, such as Category M UEs, in accordance with an embodiment of the present invention.

FIG. 1 illustrates an eNB 110 serving a population of UEs 120 including limited-capability UEs 125 such as Category M UEs. The eNB signals the location of SIBs via legacy PDCCH signalling 130 as well as alternate signalling 140 which is discernible by the limited-capability UEs. Further, the SIBs are transmitted in a manner which is discernible by the limited-capability UEs. That is, out of a set of all possible LTE transmission configurations 150, both the SIBs and the alternate signalling belong to a subset of LTE transmission configurations 155 which are discernible by the limited-capability UEs, whereas the legacy PDCCH signalling 130 belongs to the set 150.

In some embodiments, when the Category M UEs require additional time to change frequency to the frequency band in which the SIBs are located, or when the Category M UEs require additional time to decode their allocations, these UEs are given advance notice to facilitate timely preparation using "cross-subframe" scheduling. Cross subframe schedule refers to a scenario in which a downlink message transmitted in a later subframe is scheduled using signalling in an earlier subframe, rather than scheduling in the same subframe. Based on reception of the scheduling information in an earlier subframe, a UE can focus on receiving the scheduled message in the later subframe. The advanced scheduling information allows the UE time to change reception frequencies if required, and also allows the UE to prioritize which portions of the later subframe are to be buffered and processed. In particular, the UE prioritizes the portions of the later subframe which are deemed to contain the later message, as indicated by the received scheduling information.

In some embodiments, if a MNO does not want to restrict scheduling of one or more of the legacy SIB3, SIB4 and SIB5 to accommodate the constraints of Category M UEs, or if any of the SIB content exceeds 1000 bits, then the MNO may optionally cause the eNBs in its network to generate new "Category M" SIBs specifically for transmission concurrently and/or in parallel with one or more of the above-noted legacy SIBs. The Category M SIBs may be configured to include the same information as the legacy SIBs, but are transmitted in a manner that is receivable by the Category M devices.

Figure 2:
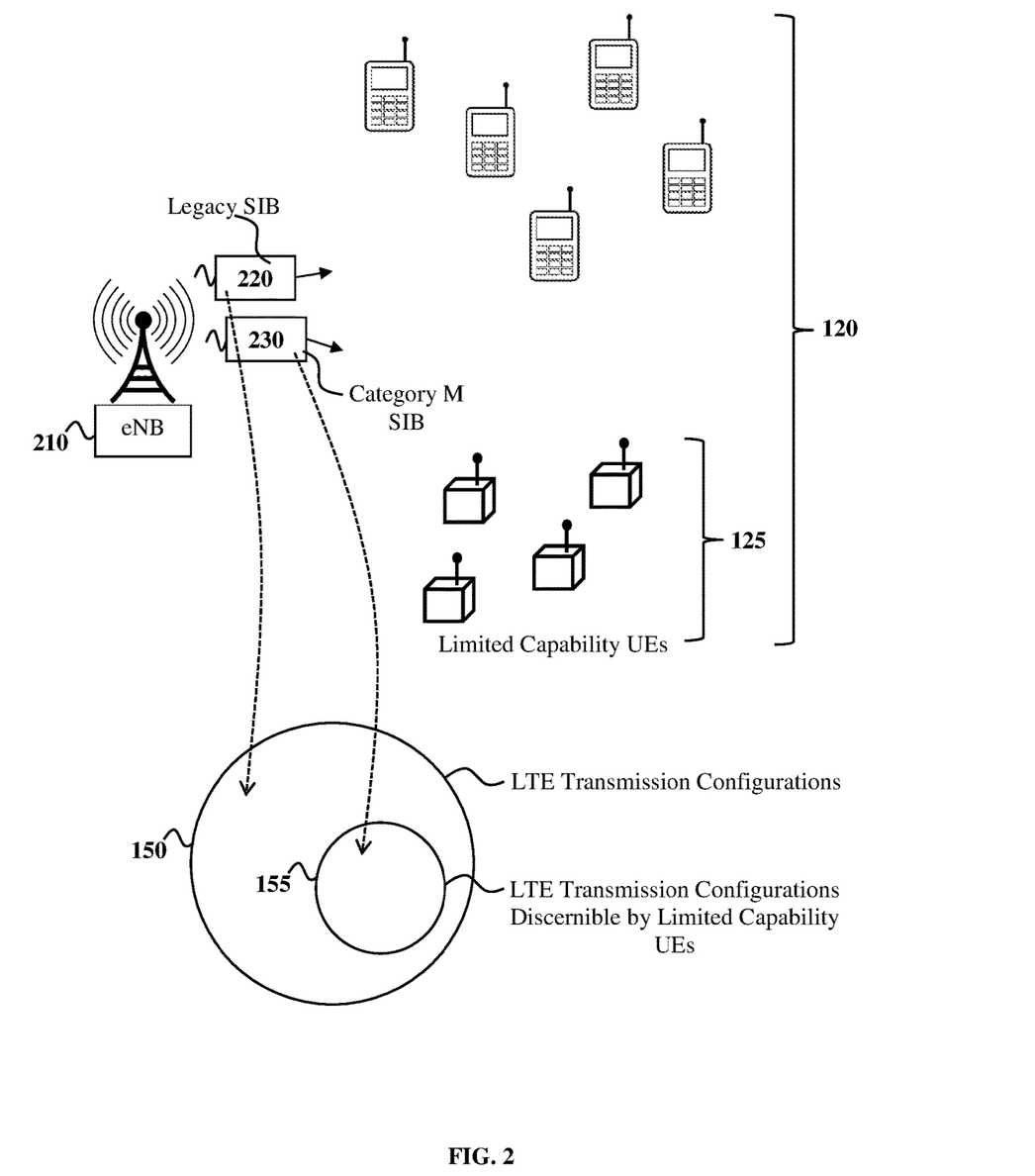
FIG. 2 illustrates an eNB serving a population of UEs including limited-capability UEs, such as Category M UEs, in accordance with an embodiment of the present invention.

FIG. 2 illustrates another eNB 210 serving a population of UEs 120 including limited-capability UEs 125 such as Category M UEs. The eNB transmits legacy SIBs 220 in parallel with "Category M" SIBs 230 which are transmitted in a manner which is discernible by the limited-capability UEs. That is, the legacy SIBs are transmitted using a configuration which belongs to the set of all possible LTE transmission configurations 150, while the "Category M" SIBs belong to the subset of LTE transmission configurations 155 which are discernible by the limited-capability UEs.

Some embodiments of the present invention are configured to accommodate a situation in which one or more of the Category M SIBs is required to convey information greater than 1000 bits. Two options for addressing this situation are as follows. In the first option, the MNO may transmit a reduced number of sets of information for neighbour cells in order to keep the message size below 1000 bits. In some embodiments, this solution results in the Category M UEs having fewer options for selecting new cells and may result in some loss of mobility performance. In some instances this could mean that a suitable cell may require a search, similar to not having been given SIB information. This may result in the UE experiencing a delay in connecting when this search may be necessary.

In the second option, the information in excess of 1000 bits may be transmitted in a separate additional Category M SIB. For example; SIB5 is currently capable of being configured to have more than 1000 bits. The corresponding Category M SIB5 with 1000 bits may be followed by a separate transmission of a "Category M SIB5bis" containing the information content in excess of 1000 bits.

In some embodiments, the presence of and scheduling of a Category M SIBnbis can be indicated in the corresponding Category M SIBn. This may have the desirable effect that no signalling of the presence or location of the Category M SIBnbis is required unless that transmission is actually required. As such, the Category M SIBn is used to convey scheduling information indicative of the presence and location of another SIB, in this case being the follow-on Category M SIBnbis.

Figure 3:
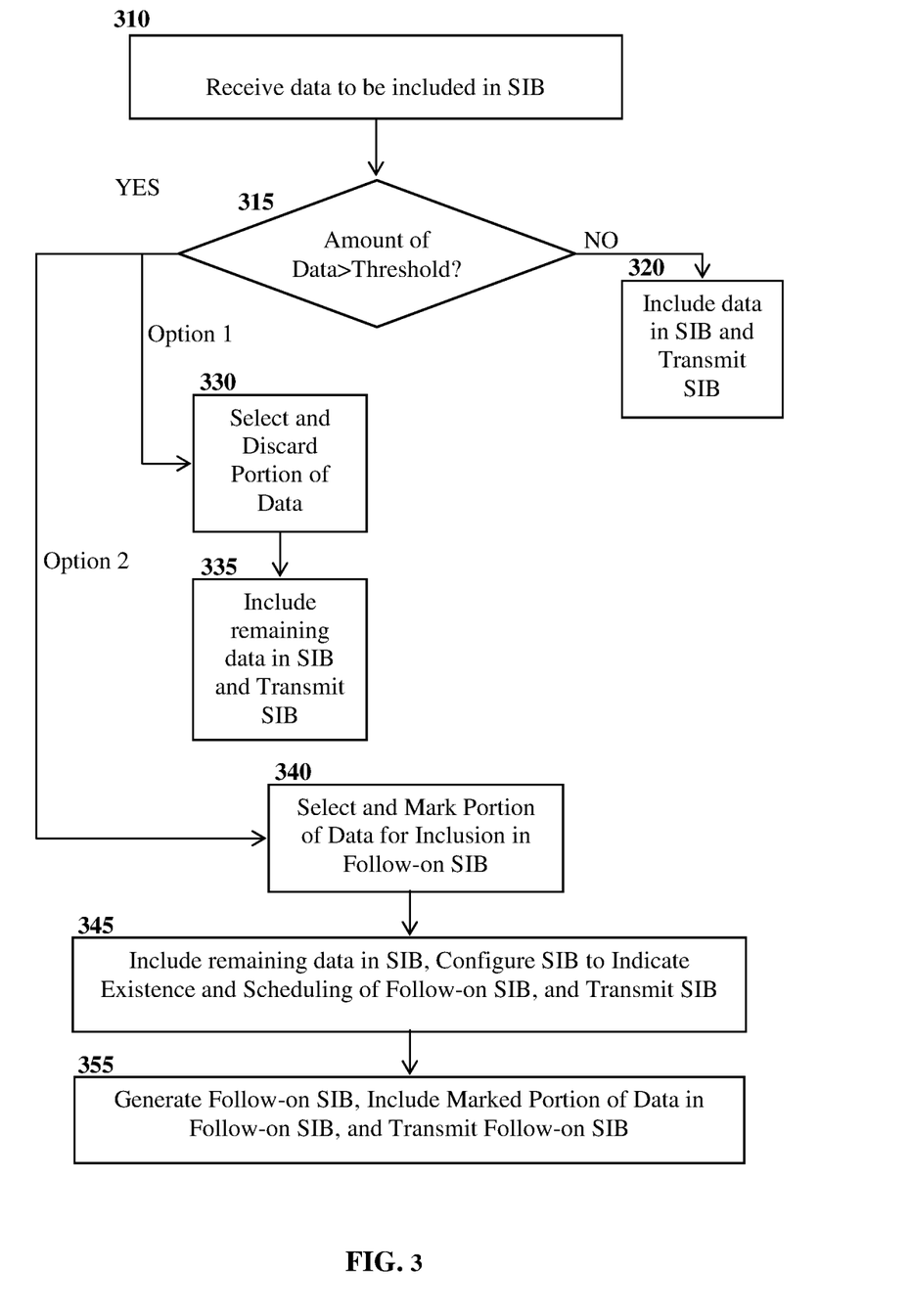
FIG. 3 illustrates a method for configuring a SIB for use by limited-capability UEs, in accordance with an embodiment of the present invention.

FIG. 3 illustrates a method for configuring a Category M SIB, in accordance with an embodiment of the present invention. Data to be included in the SIB is received 310 and a determination is made 315 as to whether the amount of data exceeds a threshold. If the threshold is not exceeded, the data is included in the SIB and the SIB is transmitted 320. In a first option, if the threshold is exceeded, a portion of the data is selected and discarded 330, and the remaining data is included in the SIB and the SIB is transmitted 335. The amount of discarded data is selected such that the amount of remaining data is less than the threshold. In a second option, if the threshold is exceeded, a portion of the data is selected and marked for inclusion in a follow-on SIB 340. The remaining data is included in the SIB and the SIB is transmitted 345. The SIB is also configured to indicate the existence and scheduling information of a follow-on SIB. The marked portion of the data is included in the follow-on SIB and the follow-on SIB is transmitted 355.

In some embodiments, SIB3 and SIB4 may be used for all categories of UEs together with a legacy SIB5 for legacy UEs and a Category M SIB5 for category M UEs. That is, SIB3 and SIB4 may be transmitted in a manner that is receivable by Category M UEs while SIB5 may not be, however a Category M SIB5 which duplicates at least some of the information as SIB5 and is receivable by Category M UEs is transmitted concurrently with SIB5. This may be appropriate particularly because legacy SIB3 and SIB4 are currently unlikely to exceed 1000 bits. In some embodiments this approach can be augmented by providing a Category M SIB5bis, to facilitate Category M support. In further embodiments, scheduling of the legacy SIBs can remain as currently specified and scheduling of legacy SIB3 and SIB4 plus the Category M SIB5 can be performed by a new scheduling mechanism in order to serve Category M UEs. In some embodiments, this can provide for an adequate idle mode mobility capability to Category M UEs with a limited impact on system capacity. In some embodiments, dual signalling and use of the same SIB3 and SIB4 can be used. That is, SIB3 and SIB4 may be receivable by both legacy UEs and limited capability UEs, and further SIB3 and SIB4 may be scheduled using two different mechanisms, one mechanism being discernible by legacy UEs and the other being discernible by limited capability UEs.

In some embodiments, provision of Category M service is provided whether or not coverage enhancement (CE) is provided. In some embodiments, coverage enhancement can be offered as an option and, when offered, it can be accessible to all categories of UE including Category M. In some embodiments, in order to access coverage enhancement service, all categories of UEs must act as if they are Category M devices with respect to at least transport block size (TBS), physical resource block (PRB) and signalling limitations.

In some embodiments, the LTE mobility feature requiring reception of information in SIB3, SIB4 and SIB5 is not expected to be used in coverage enhancement. As such, in some embodiments, practical limitations on mobility that will be imposed by the need to transmit and receive multiple copies of communications between the eNB and UE in CE can make it difficult to reliably offer mobility features.

In some embodiments, the above-noted issue can mean that transmission of SIB3, SIB4 and SIB5, any transmissions of Category M SIB3, SIB4 and SIB5, and any "bis" additions thereto, will not need to be transmitted more frequently in order to be capable of being received in coverage enhancement mode. In some embodiments, this can mean that it is unnecessary to frequently repeat the scheduling transmissions for indicating the presence and locations of SIB3, SIB4 and SIB5 or Category M versions of SIB3, SIB4 and SIB5 in order to provide enhanced coverage, and such frequent repetition can therefore be inhibited. In some embodiments, the Category M SIB3, SIB4 and SIB5 scheduling information may be included in a Category M SIB2 (or alternatively in a Category M SIB2bis) that is transmitted to provide information to Category M UEs whether in normal or enhanced coverage.

In some embodiments, a "Category M" SIB is provided which contains scheduling information of other SIBs, which may include other Category M SIBs, legacy SIBs, or both. In some embodiments, the SIB containing the scheduling information is a Category M SIBnbis system information block. In some embodiments, when this SIB contains scheduling information for a particular other SIB, such as a legacy SIB, the scheduling information indicates the same location for the other SIB as the PDCCH does. As such, scheduling information regarding a SIB can be indicated using information transmitted both via the PDCCH and via another SIB. This provides for a redundant transmission of scheduling information, such that at least one means of conveying the scheduling information is receivable by limited capability UEs such as Category M UEs, and the other means of conveying the scheduling information may not necessarily be receivable by the limited capability UEs.

In some embodiments, therefore, in addition to or alternatively to using a SIBnbis follow-on SIB to convey information that is in excess of an upper limit, the SIBnbis can be used more specifically to convey scheduling information, which may be regarded as an instance of excess information.

Embodiments of the present invention provide for a method for communicating system information from a base station, such as an eNB, to a user equipment (UE) in a wireless communication system, such as an LTE network. Having reference to FIG. 4, the method includes configuring 410 a system information block (SIB) in a configuration that is receivable by the UE. The UE is a limited-capability UE which is capable of receiving wireless transmissions from the base station in a limited manner relative to another class of UE compatible with the wireless communication system. This UE may be a Category M UE. The SIB is subsequently transmitted. In some embodiments, the SIB is configured to include 415 information indicative of a schedule of one or more additional SIBs transmitted in the configuration which is receivable by the UE. In some embodiments, the base station further transmits 420 said information indicative of the schedule of the one or more additional SIBs in another manner, such as via a legacy SIB, which is beyond capabilities of the UE to receive and within capabilities of said other class of UE to receive.

Figure 4:
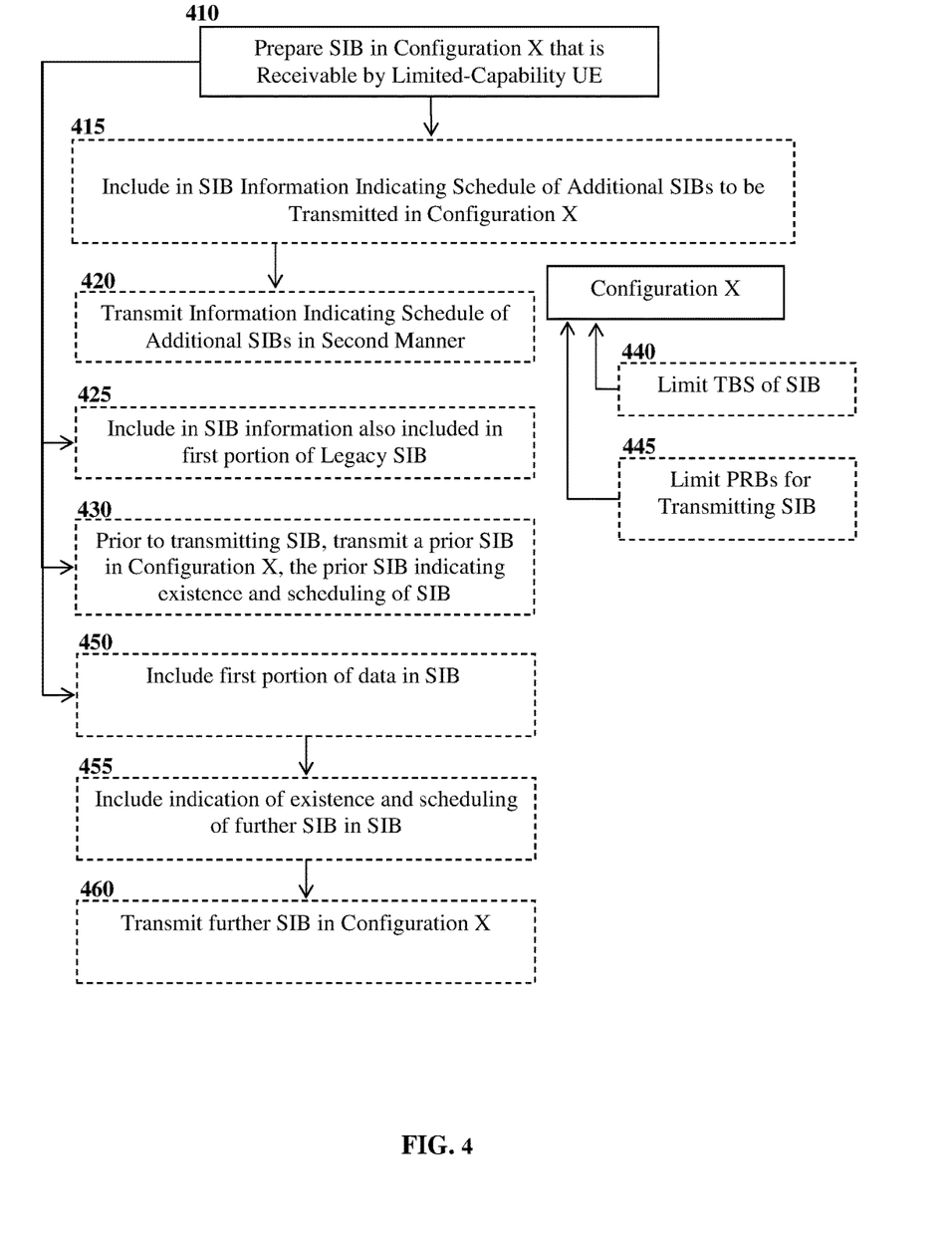
FIG. 4 illustrates a method for communicating system information from a base station, such as an eNB, to a user equipment (UE) in a wireless communication system, such as an LTE network, in accordance with an embodiment of the present invention.

In some embodiments, the SIB includes 425 information which is also included in a first portion of a legacy SIB, and one of the additional SIBs includes information included in a second portion of the legacy SIB. The additional SIBs may include, for example, SIB3, SIB4, SIB5, or another SIB indicative of parameters for selecting alternative cells in the LTE system.

In some embodiments, the method includes, prior to transmitting the SIB, transmitting 430 another SIB in the configuration that is receivable by the UE, said other SIB including information indicative of existence and scheduling of the SIB.

In some embodiments, transmitting the SIB in the manner which is receivable by the UE includes one or both of: limiting 440 a transport block size of the SIB; and limiting 445 the number of contiguous physical resource blocks used for transmitting the SIB.

In some embodiments, the SIB is used to convey data normally included in a legacy SIB of a Long Term Evolution (LTE) wireless communication system, and the method further comprises: including 450 a first portion of said data in the SIB; including 455 information indicative of existence and scheduling of a further SIB in the SIB; and transmitting 460 the further SIB in the configuration that is receivable by the UE, the further SIB including a second portion of said data.

eNB Capability Indication and System Information Modification Period

As is known in the art, Category M UEs typically have limited capability relative to other categories of UEs. In particular in some cases, Category M UEs can only be able to receive about 1000 bits TBS and only receive and transmit in a 6 PRB wide (1.4 MHz) band. This means that such Category M UEs cannot receive the entirety of the existing LTE PDCCH channel that contains legacy system information blocks (SIBs). According to some embodiments of the present invention, a Category M main system information block (Category M SIB1) may be provided and used to transmit information to Category M UEs including indicating, to these UEs, the time and/or frequency location of transmissions of additional system information, when necessary.

In some embodiments, Category M UEs are allowed to access eNBs that have been configured for supporting them. Category M and legacy UEs can also be allowed access to eNBs that are configured to support a coverage enhancement (CE) mode. CE mode can require multiple repetitions of transmissions and receptions in order to conduct more successful communication. In some embodiments, in order to use CE mode, all categories of UEs may be configured to operate within the limitations of Category M UEs.

In some embodiments, Category M UEs may be provided with information indicative of whether a given eNB supports their mode of operation. In some embodiments, UEs are provided with information indicative of whether Coverage Enhancement (CE) is supported. Legacy eNBs that have not been updated to 3GPP™ LTE Release 13 are not expected to support Category M or CE, and support by Release eNBs 13 may be optional. In some embodiments, an indication of support for Category M can be receivable in a timely manner and potentially as soon as possible when a UE receives a signal from an eNB. Information that is not placed in a known location or that can be in several locations may be more difficult to detect without error or may require multiple blind decoding attempts. All of this may waste power in a Category M UE that is intended to operate on a limited power budget. The power used for these purposes can be a concern if a UE is required to receive multiple copies of a signal in CE mode.

In some embodiments, Category M UEs and other UEs using CE require information indicative of whether system information is correct and up-to date. In legacy operation a system information radio network temporary network identifier (SI-RNTI) notification is transmitted to indicate to UEs that the SI has changed. UEs can also be configured to check a version number in the system information, but this requires the UEs to regularly receive the system information to determine whether it has changed. Upon receipt of SI-RNTI notification, UEs may be configured to temporarily inhibit transmission and receive the updated SI before resuming transmissions. The existing SI-RNTI may not be accessible to Category M UEs and those in CE. A new SI-RNTI delivery mechanism for Category M UEs and/or for UEs operating in CE mode may therefore be desirable.

In some embodiments, a predetermined modification period is defined during which System Information (SI) remains constant. The modification period may correspond to the maximum System Frame Number (SFN) count period. This currently runs for 10.24 seconds before starting again at 0. Changes to SI are configured to occur at the time corresponding to the end of the SFN count period. The LTE RAN2 standards group has agreed to a 10.24 second allowance for a UE in maximum CE mode to be able to read system information. In some cases, several hundred (for example 400) copies of a SI message may be required in order to receive same. At a repetition frequency of essential SIB1 and SIB2 information of 10 ms and 20 ms, it is calculated to take 8 seconds to receive 400 repetitions. More frequent repetitions in order to reduce the total reception time may be achieved at the expense of loss of system data capacity efficiency. Given that Category M SIBs are to be used in addition to legacy SIBs, it can be desired to keep the signalling overhead low.

According to the current SFN count this means that if a UE in CE mode does not align its 8 second of reception to the 10.24 second period, for example due to random chance, the UE may not be able to receive sufficient copies of the system information without crossing a change boundary. In some embodiments, the UE may be configured to read the SFN count in the MIB and align its reception operations accordingly. However, it is expected that doing this can require a delay of up to 8 seconds in about 80% of cases.

In various embodiments of the present invention, the Master Information Block (MIB) is transmitted frequently in a robust format in order to provide to UEs a set of the most important information to enable them to detect and receive LTE transmission from an eNB.

There are currently 10 spare bits in the LTE-defined MIB that may be used for future requirements. In some embodiments of the present invention, one of these spare bits may be reallocated to indicate support for Category M.

CE is expected to be offered in three optional ranges of CE. This is because MNOs may want to support CE to a lesser degree in order to limit the amount of overhead necessary for the multiple transmissions and receptions of signalling and data.

In some embodiments, an indication in MIB can support indicating the level of coverage enhancement. Support of a given level of coverage enhancement by default can indicate support of Category M UEs but the indication of Category M UE support may need to be separate from an indication of support for CE, in case CE is not allowed. In some embodiments, two bits in the MIB, such as two bits designated as spare bits in the current LTE standard, are used to indicate support for the three levels of CE.

In some embodiments, the MIB includes a count of SFN up to 10.24 seconds. Each sub-frame is 1 ms.

A longer SI modification time may be required for UEs operating in CE mode. In some embodiments, the SFN count may be extended in order for the UEs to know when a change can occur. In some embodiments, this is implemented by configuring two bits of the MIB to indicate the extended SFN count. The added bits may be bits of the MIB that are designated as spare bits in the current LTE standard. In this case, legacy UEs would still see modifications on multiples of the 10.24 second count. Two bits in the MIB can extend the count to 40.96 seconds which can be sufficient in most cases to provide for a situation in which, if 8 seconds is needed for reception, this 8 seconds will not cross a modification boundary.

In some embodiments, a total of five bits of the MIB, such as five bits which are designated as spare bits in the current LTE standard, are assigned and used to provide indications of Category M and CE support as well as an extended SFN count.

For example, in a current version of the LTE standard, the MIB includes 14 information bits, 10 spare bits and 16 CRC bits. The 14 information bits indicate the downlink system bandwidth, the Physical Hybrid ARQ Indicator Channel (PHICH) size, and the most-significant eight bits of the System Frame Number (SFN). The remaining two bits of the SFN may be determined based on the 40 ms periodicity of the PBCH.

In some embodiments, an extended SFN count can be used to provide for a wider range of clock drift in a long extended DRX cycle. For example in some embodiments, a UE can sleep for up to about 1 hour in order to save power. It wakes at a time that it expects to receive a page. If no page is received, the UE goes back to sleep. Current paging opportunities may be defined within the existing 10.24 second SFN count. If the UE has an inaccurate clock oscillator during sleeping, it could potentially wake in the wrong 10.24 second interval and see no page. The UE would not know whether or not it had missed its paging time or that there had simply been no page for it and would go to sleep for another hour, possibly waking again in the wrong 10.24 second. According to embodiments of the present invention, a longer SFN count can be used to facilitate detection of missed timing by a UE over a wider range of time and therefore enable the UE to know its clock has drifted. The UE may then take corrective action or fault reporting for example.

In some embodiments, the SFN count can be configured to include a further extended SFN count in addition to the extra two bits in the MIB, for example implemented in a Category M SIB, to facilitate providing a more precise definition of time within the long eDRX interval of over one hour. However, it is noted that placing such a long count in the MIB may use a relatively large number of the spare bits.

In various embodiments, the extended SFN count is a count tracked by the system and indicated at least partially by designated fields in the MIB. The extended SFN count increments by one bit every 10.24 seconds. It is noted that other appropriate intervals may be used, as appropriate to the communication system being implemented. By allocating n bits to the extended SFN count, a timer can be defined which counts up to $2^n$ times the 10.24 second interval. By selecting an appropriate number of bits, such a count may be designed to run for minutes or hours before cycling back to zero. The event of the counter changing from a value indicative of a maximum (e.g. 1 . . . 111) back to a value indicative of zero (e.g. 0 . . . 000) is designated as the count roll-over.

In various embodiments, at least some of the least significant bits of the extended SFN count are transmitted as bits in the MIB. This can make the bits readily available for use since UEs can obtain the bits from the MIB rather than the SIB. As such, time and power expended by a UE to obtain the bits may be reduced. The UE can use the bits indicative of the extended SFN count to determine an indication of system timing.

In some embodiments, obtaining an indication of system timing over a range greater than 10.24 seconds may be useful for example if system information changes, such as changes to data transmitted in one or more SIBs, are constrained to occur only on the roll-over to zero of the SFN count that is visible in the MIB. For example, if the MIB includes two bits indicative of the extended SFN count, then the UE may determine the timing of the next 40.96 second count roll-over based on these two bits.

Alternatively to adapting the MIB of the current LTE standard by allocating spare bits thereof, a new MIB may be defined having the properties as described herein.

Figure 5:
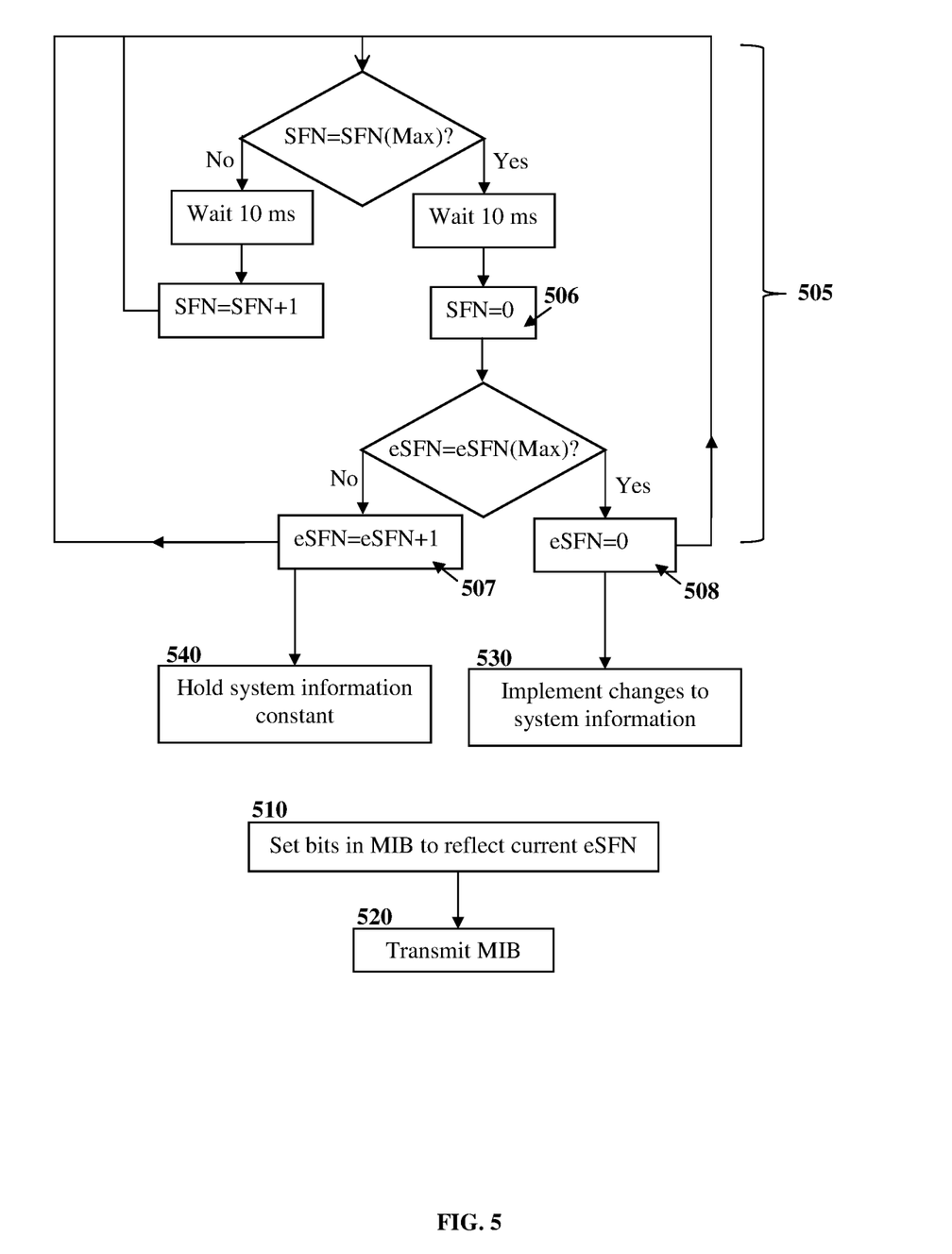
FIG. 5 illustrates a method for communicating system information from a base station to a user equipment, in accordance with an embodiment of the present invention.

FIG. 5 illustrates an embodiment of a method for communicating system information from a base station to a user equipment (UE) in a Long Term Evolution (LTE) wireless communication system, according to an embodiment of the present invention. An extended System Frame Number (eSFN) is tracked 505 by the base station. The extended SFN count is incremented at a period which is longer than an increment period of a SFN counter tracked by the LTE wireless communication system. In some embodiments, the extended SFN count is incremented once per cycle of the SFN counter. In the illustrated embodiment, the extended SFN count is incremented 507 during roll-over 506 of the SFN counter from a maximum value to a minimum value. One or more bits indicative of a current value of the extended SFN count are set 510 in the MIB prior to transmission. The method further includes transmitting 520 the MIB from the base station. The method further includes synchronizing 530 changes to system information transmitted by the base station to times during which the extended SFN count has a predetermined range of values. In the illustrated embodiment, predetermined range of values corresponds to roll-over 508 of the extended SFN count from a maximum value to a minimum value. The method further includes holding 540 system information constant during a modification period corresponding to a time interval during which the extended system frame number count is nonzero.

Random Access UE Capability Indication

Embodiments of the present invention provide a mechanism by which an eNB can quickly determine, during a call setup, that a Category M UE or another UE category operating in CE mode is communicating with it.

This determination may be desirable in order to cause the eNB to avoid using legacy methods for scheduling of a response to the UE, because such legacy methods may violate constraints of the UE. For example, legacy scheduling may cause a transmission in excess of the 1000 bit limit that the UE can receive, or may violate a requirement that the response be scheduled in more than 6 contiguous PRBs. The eNB may be configured to use a scheduling mechanism for responses and for communication with such UEs, possibly involving advanced notice in the form of cross sub-frame scheduling. This is because legacy UEs receive their allocations from the PDCCH field at the beginning of the same 1 ms sub-frame in which they will receive their data in the PDSCH field. Category M UEs and CE mode UEs may use a different mechanism for indication and may be scheduled for a 1 ms subframe after the current one. If the eNB is not given an indication that the UE has limited capabilities, then the eNB response may not be discernible by the UE, and the UE may continue to try to access the eNB unsuccessfully.

In addition, a UE in CE mode may be configured to indicate its specific CE needs to the eNB being contacted, and the eNB can accordingly be configured to transmit multiple copies of its response so that the UE will be able to accumulate sufficient copies in order to receive and decode the response. Responses from the UE to the eNB may also be repeatedly sent and accumulated by the eNB and the amount of such repetition may vary depending on the amount of coverage enhancement to be provided. Three levels of CE have been proposed. Each level of CE may be handled differently.

In some embodiments, UEs initiate contact with an eNB by transmitting with one scrambling code selected at random from a set of available codes, namely the random access preambles. The range of available preamble codes is indicated by the eNB in a legacy system information block. If multiple UEs transmit at the same time, their transmissions may be received simultaneously as long as they choose different random access preambles. This method is aided by a power control operation by which the UEs can adjust transmit power levels to make all of them appear to have similar power at the eNB.

In some embodiments, for UEs in CE beyond the normal coverage area, substantially all transmissions from such UEs may appear to have low power when received by the eNB, even when the UEs are transmitting at full power. It is to be expected that UEs using CE mode will normally transmit at full power. Given that there is a range of up to 15 dB of coverage enhancement, if these UEs were to share the same set of Random Access preambles as UEs in normal coverage, their transmissions may not be easily received by the eNB due to the problem of being overpowered by simultaneous transmissions by UEs in normal coverage. Random Access transmissions from CE UEs may also need to be received repeatedly in order to be received by the eNB.

It was proposed during LTE Release 12 standardization that a Category 0 UE would call random access (RA) using the existing mechanism for RA preambles, but with a partition added so that the Category 0 UEs would use a reserved set of preambles from the existing set. The eNB would then detect that a Category 0 UE was calling by detecting that the preamble being used is from the reserved set. Legacy UEs would be informed that the normal range of available preambles had been reduced. New signalling would indicate the separate range of preambles to Category 0 UEs. This method was not chosen for LTE release 12 due to concerns about loss of the number of available preambles for legacy devices. Additionally there was concern about the practicality of changing the number of preambles to accurately reflect the numbers of the different categories of UEs that would need to be serviced at a given time. Relaxation of the performance restrictions for Category 0 devices made it possible to indicate Category 0 capability in a different message in the protocol. The method of separate preambles within the existing field has also been proposed for indication of Category M status and also for CE indication. The number of partitions could become impractical in this case. The problem of adjusting the size of the ranges and indicating changes, particularly when there would be delayed response from CE UEs, would make this a difficult solution to manage. It also does not solve the near-far problem of having UEs call with up to 15 dB less power than other UEs.

In some embodiments, the existing random access preamble range is partitioned to indicate Category M status, in the same way that was proposed for Category 0. That is, a Category M UE is configured to select a random access preamble from a set of reserved preambles. However, the near-far problem and repetition and response issues would not be a concern just for Category M in normal coverage.

In some embodiments, for CE mode, a new method of calling from a UE to a eNB is provided.

In some embodiments, separate time and frequency allocations can be established for random access calling by UEs in each of a plurality of categories of UE. For example, such categories of UEs may include some or all of Category M, and CE levels 1, 2 and 3 UEs. Indication in MIB bits (which may be bits which are designated as spare bits in the current LTE standard) of Category M, and CE levels 1, 2 and 3 can correspond with the opening of the corresponding separate windows of time and frequency allocations for random access calling. The existing range of available RA preambles may be duplicated in each of the separate windows. This can keep the allocations separate, allowing more total capacity. This approach may lead to limited or substantially zero impact on legacy operation at least in terms of the number of RA preambles available to legacy UEs and/or the need to signal and adjust the range of preambles that legacy UEs can use.

In various embodiments, a UE can indicate its operating requirements and/or an indication of its category (e.g. Category M, CE level 1, 2, or 3, or the like), by using a particular time and frequency to call RA. The operating requirements may include coverage enhancement requirements. A plurality of different time and frequency resources can be pre-defined and associated with different operating requirements and/or UE categories. When a UE uses a particular one of these time and frequency resources, the eNB interprets its resource usage as an indication by the UE of its current operating requirements and/or category.

In some embodiments, the time and frequency allocations for UEs operating according to a CE level can be configured to match the eNB operation with the expectations of correspondingly longer delays to allow for repetitions.

In some embodiments, the three CE levels represent separate ranges of 5 dB. For example, level 1 CE may correspond to a signal strength that is lower than the legacy minimum in a range of between 1 and 5 dB, level 2 CE may correspond to a signal strength that is lower than the legacy minimum in a range of between 6 and 10 dB, and level 3 CE may correspond to a signal strength that is lower than the legacy minimum in a range of between 11 and 15 dB. The problem of a strong signal overpowering weaker ones still remains if individual UEs fail to accurately predict their needs. This can be an issue when a UE moves, or something in its near environment moves, changing the wireless environment propagation characteristics. This can also be an issue in frequency division duplex (FDD) mode, where the received signal is less likely to be an accurate representation of propagation on the transmitted channel than it would be in time division duplex (TDD) mode on one frequency. In some embodiments, a UE is configured to transmit its preambles in the time and frequency window corresponding to a lower level of coverage enhancement and then attempt to retransmit its preambles in the time and frequency window corresponding to a higher level of coverage enhancement if the UE receives no response. For example a UE may estimate a need for level 3 CE, (11-15 dB), but it may make its first request on at least CE level 2 (6-10 dB).

In some embodiments, a UE may be configured to start transmitting preambles at a particular time. When multiple transmissions are repeated, this approach results in the eNB only being required to window its accumulation of random access repetitions over a known time interval. This approach may reduce the required amount of eNB processing and memory when compared with allowing UEs to start at a more arbitrary set of times.

Figure 6:
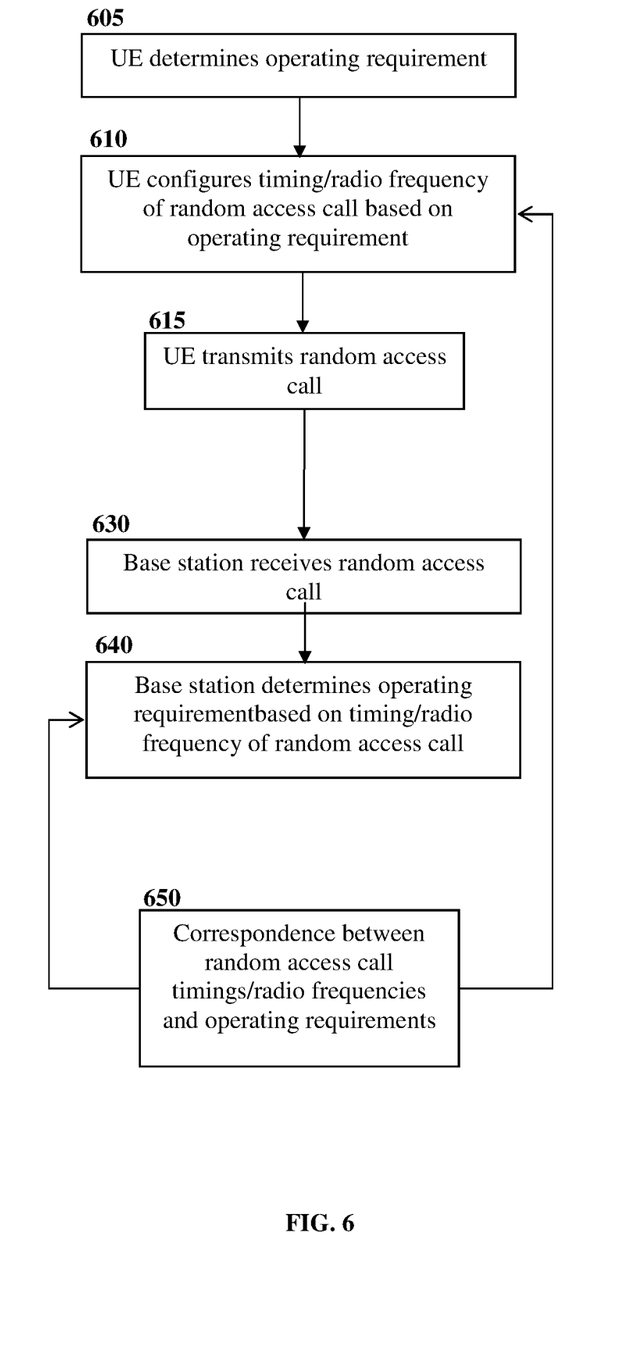
FIG. 6 illustrates a method for communicating operating information from a user equipment to a base station, in accordance with an embodiment of the present invention.

FIG. 6 illustrates method for communicating operating information from a UE to a base station in a Long Term Evolution (LTE) wireless communication system, according to an embodiment of the present invention. The method includes transmitting 615, from the UE, a random access call. Prior to transmission, one or both of: a timing of the random access call; and a radio frequency of the random access call are configured 610 to fall within a range which corresponds to an operating requirement of the UE. The operating requirement may include a requirement to treat the UE as a limited-capability UE, a Category M UE, or both, and/or a requirement to interact with the UE using a Coverage Enhancement (CE) mode. The method further includes wirelessly receiving 630 the random access call at the base station. The method further includes determining 640, by the base station, an operating requirement of the UE. The operating requirement is determined based on one or both of: a timing of the random access call; and a radio frequency of the random access call. The operating requirement is also determined based on a predetermined correspondence 650 between a plurality of UE operating requirements and a respective plurality of random access call timings, radio frequencies, or both, indicative of each one of the plurality of UE operating requirements. Both the UE and the base station are informed of the correspondence 650. The characteristics of the random access call, such as the timing and/or radio frequency, therefore carry information about the operating requirements of the UE.

CE Mode Modifications

In some embodiments, when dealing with signals of substantially widely varying power, there may be an issue related to near-far power imbalance. Adjacent channels of the LTE spectrum are orthogonal insofar as the UEs transmit on their allocated frequencies. In some embodiments, the uplink can allow partitioning of frequencies at the resource element (individual carrier) level. Individual UEs transmitting slightly off their correct frequency can cause some co-channel interference due to not being completely orthogonal in frequency. This can be more likely to occur for highly mobile UEs having Doppler-shifted frequencies. The potential problem can become worse when there is a wider power level variation between the UEs, such as when some are transmitting from CE positions that may be up to about 15 dB lower.

In some embodiments, to address this issue, strong mobile UEs may be refrained from being allocated and scheduled in frequency grid positions adjacent to static UEs using CE. Strong mobile UEs may exhibit high mobility, high received signal strength at the eNB, or both.

In some embodiments, this approach can also apply to placement of the proposed windows of time and frequency used for random access preamble for CE mode. These may be separated from signals that may be transmitted in the uplink by more powerful, highly mobile UEs.

Implementation Details

Figure 7:
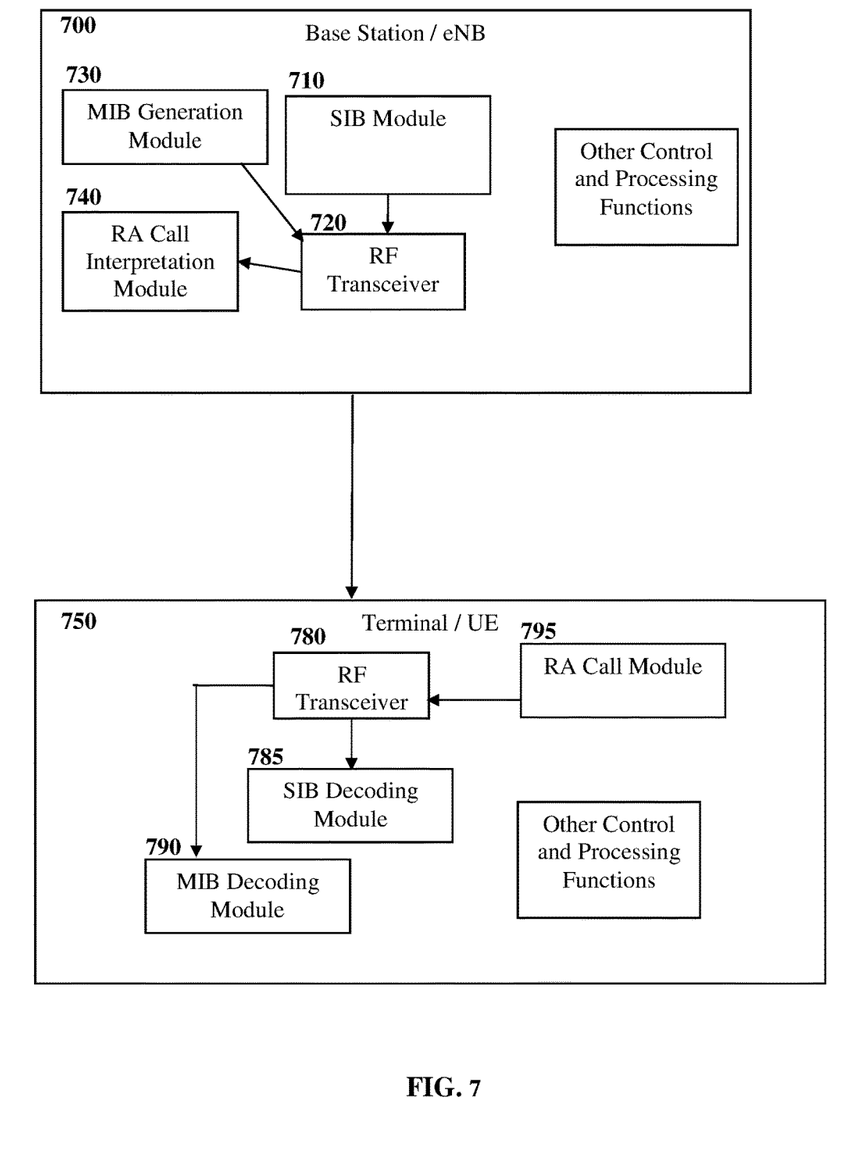
FIG. 7 illustrates an apparatus provided in accordance with an embodiment of the present invention.

With reference to FIG. 7, another aspect of the present technology provides a wireless communication system comprising a base station 700 such as an eNB or other access node or edge node of a wireless communication network, and a wireless terminal (UE) 750. Although only a single UE 750 is shown, typically the system will comprise a plurality of such UEs associated with each of a plurality of base stations. The UE may be a Category M UE or other limited-capability UE. The system is configured in part for wirelessly communicating system information, such as SIBs, from the base station to the UE. The base station is configured in particular to broadcast the system information in accordance with a predetermined standard, such as LTE. As will be readily understood, the various modules of the base station and UE may be implemented using existing hardware, such as microprocessors, signal processors, integrated circuits, digital and/or analog electronics, or the like. The existing hardware may be adapted to carry out the functions as described herein via specially provided software or firmware, for example. In certain embodiments, electronic components such as FPGAs, ASICs, microcontrollers, digital or analog components, are configured to operate according to embodiments of the present invention. Existing components of base stations and/or UEs may be adapted for this purpose, for example via firmware and/or electronic hardware modification.

The above-mentioned wireless communication system comprises a base station having an SIB module 710 and a radio frequency transceiver 720. The base station otherwise includes the necessary components of a standard base station, such as an eNB in LTE. In some embodiments, the SIB module 710 is configured to generate and/or define system information blocks (SIB) as described elsewhere herein. The transceiver 720 is configured to transmit the system information block (SIB). In some embodiments, the base station is configured to generate MIBs having an extended SFN count as described elsewhere herein, for example using a MIB generation module 730, and to transmit the MIBs using the transceiver 720. In some embodiments, the base station is configured to receive a random access call from the UE using the transceiver 720 and to determine operating requirements of the UE based on timing and frequency of the random access call, as described elsewhere herein, for example using a random access call interpretation module 740.

The UE of the above-mentioned system comprises a radio frequency transceiver 780. The UE otherwise includes the necessary components of a standard UE, such as a mobile or non-mobile UE or machine-to-machine terminal of an LTE network. The transceiver 780 is configured to receive system information blocks (SIBs) as transmitted by the corresponding transceiver 720 of the eNB, as well as other signals such as scheduling information, control and data signals, and the like. In various embodiments, the transceiver 780 has only the capabilities specified for a Category M UE. The UE may include a SIB decoding module 785 configured to receive and decode transmitted SIBs according to the limited capabilities of a Category M UE. The UE may include a MIB decoding module 790 configured to receive transmitted MIBs and to discern an extended SFN count based on same. The UE may include a random access call module 795 configured to generate random access calls having timing and/or frequency characteristics which are selected so as to communicate an operating requirement of the UE, as described elsewhere herein.

The UE and/or the eNB may comprise one or more functional modules, such as the SIB module, which are configured to automatically perform certain operations. A functional module may comprise various electronic components such as RF components, signal processing components, baseband components, computational components, or the like, or a combination thereof. These components may include conventional UE and/or eNB components which are adapted to perform particular functions as described herein. A given component may potentially be part of more than one functional module.

It will be appreciated that, although specific embodiments of the technology have been described herein for purposes of illustration, various modifications may be made without departing from the spirit and scope of the technology. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each step of the method may be executed on an electronic device, such as a personal computer, mobile or handheld wireless device, M2M device, PDA, base station or eNB, or the like and pursuant to one or more, or a part of one or more, program elements, modules or objects generated from any programming language, such as C++, Java, PL/1, or the like. In addition, each step, or a file or object or the like implementing each said step, may be executed by special purpose hardware or a circuit module designed for that purpose.

It is obvious that the foregoing embodiments of the technology are examples and can be varied in many ways. Such present or future variations are not to be regarded as a departure from the spirit and scope of the technology, and all such modifications as would be obvious to one skilled in the art are intended to be included within the scope of the following claims.

We claim:

1. A method for communication system information from a base station transmitting a system information block (SIB) in a configuration that is receivable by the UE, the SIB including an amount of data, wherein the UE is a limited-capability UE which is capable of receiving wireless transmissions from the base station in a limited manner relative to another class of UE compatible with the wireless communication system;
wherein transmitting further includes determining whether the amount of data exceeds a threshold and upon determination that the amount of data is below the threshold, including the data in the SIB and transmitting the SIB; and, wherein upon determination that the amount of data exceeds the threshold, transmitting further includes selecting a portion of the amount of data such that a remaining portion of the amount of data is less than the threshold and including the remaining portion of the amount of data in the SIB and transmitting the SIB.

2. The method according to claim 1, wherein the portion of the amount of data is discarded.

3. The method according to claim 1, wherein the portion of the amount of data is transmitted in a subsequent SIB.

4. The method of claim 1, wherein the SIB includes information indicative of a schedule of one or more additional SIBs transmitted in the configuration that is receivable by the UE.

5. The method of claim 4, wherein the base station further transmits said information indicative of a schedule of the one or more additional SIBs in a manner which is beyond capabilities of the UE to receive and within capabilities of said another class of UE to receive.

6. The method of claim 5, wherein said manner includes transmitting a legacy SIB including said information indicative of the schedule of the one or more additional SIBs.

7. The method of claim 4, wherein the SIB includes information included in a first portion of a legacy SIB, and one of the additional SIBs includes information included in a second portion of the legacy SIB.

8. The method of claim 4, wherein the additional SIBs include one or more of: SIB3, SIB4 and SIB5 transmitted in accordance with a Long Term Evolution (LTE) wireless communication system, or wherein the additional SIBs include another SIB indicative of parameters for selecting alternative cells in the LTE system.

9. The method of claim 4, further comprising, prior to transmitting the SIB, transmitting another SIB in the configuration that is receivable by the UE, said another SIB including information indicative of existence and scheduling of the SIB.

10. The method of claim 1, wherein transmitting the SIB in the configuration which is receivable by the UE includes one or both of: transmitting the SIB using a limited transport block size; and transmitting the SIB using a limited number of contiguous physical resource blocks.

11. The method of claim 1, wherein the SIB is used to convey data normally included in a legacy SIB of a Long Term Evolution (LTE) wireless communication system, the method further comprising: including a first portion of said data in the SIB; including information indicative of existence and scheduling of a further SIB in the SIB; and transmitting the further SIB in the configuration that is receivable by the UE, the further SIB including a second portion of said data.

12. A base station configured for communicating system information to a user equipment (UE) in a wireless communication system, the base station comprising:
a system information block (SIB) module configured to generate a SIB in a configuration that is receivable by the UE, the SIB including an amount of data, wherein the UE is a limited-capability UE which is capable of receiving wireless transmissions from the base station in a limited manner relative to another class of UE compatible with the wireless communication system; and
a radiofrequency transceiver configured to transmit the SIB in said configuration;
wherein the SIB module is configured to determine whether the amount of data exceeds a threshold and upon determination that the amount of data is below the threshold, include the data in the SIB; and
wherein upon determination that the amount of data exceeds the threshold, the SIB module is further configured to select a portion of the amount of data such that a remaining portion of the amount of data is less than the threshold and including the remaining portion of the amount of data in the SIB.

13. The base station according to claim 12, wherein the portion of the amount of data is discarded.

14. The base station according to claim 12, wherein the portion of the amount of data is transmitted in a subsequent SIB.

15. The base station of claim 12, wherein the SIB module is configured to include, in the SIB, information indicative of a schedule of one or more additional SIBs transmitted by the radiofrequency transceiver in the configuration which is receivable by the UE.

16. The base station of claim 12, wherein the radiofrequency transceiver is further configured to transmit said information indicative of the schedule of the one or more additional SIBs in a manner which is beyond capabilities of the UE to receive and within capabilities of said another class of UE to receive.

17. The base station of claim 16, wherein said manner includes transmitting a legacy SIB including said information indicative of the schedule of the one or more additional SIBs.

18. The base station of claim 15, wherein the SIB module is further configured to: include, in the SIB, information also included in a first portion of a legacy SIB; and to include, in one of the additional SIBs, information also included in a second portion of the legacy SIB.

19. The base station of claim 15, wherein the additional SIBs include one or more of: SIB3, SIB4 and SIBS5 transmitted in accordance with a Long Term Evolution (LTE) wireless communication system, or wherein the additional SIBs include another SIB indicative of parameters for selecting alternative cells in the LTE system.

20. The base station of claim 15, further configured, prior to transmitting the SIB, to transmit another SIB in the configuration that is receivable by the UE, said other SIB including information indicative of existence and scheduling of the SIB.

21. The base station of claim 12, wherein transmitting the SIB in the configuration which is receivable by the UE includes one or both of: transmitting the SIB using a limited transport block size; and transmitting the SIB using a limited number of contiguous physical resource blocks.

22. The base station of claim 12, wherein the SIB is used to convey data normally included in a legacy SIB of a Long Term Evolution (LTE) wireless communication system, the SIB module further configured to: include a first portion of said data in the SIB; include information indicative of existence and scheduling of a further SIB in the SIB; and the radio frequency transceiver further configured to transmit the further SIB in the configuration that is receivable by the UE, the further SIB including a second portion of said data.

* * * * *